Dec. 6, 1949  C. R. BUSCH  2,490,205
BRAKE BEAM
Filed May 13, 1946  3 Sheets-Sheet 1
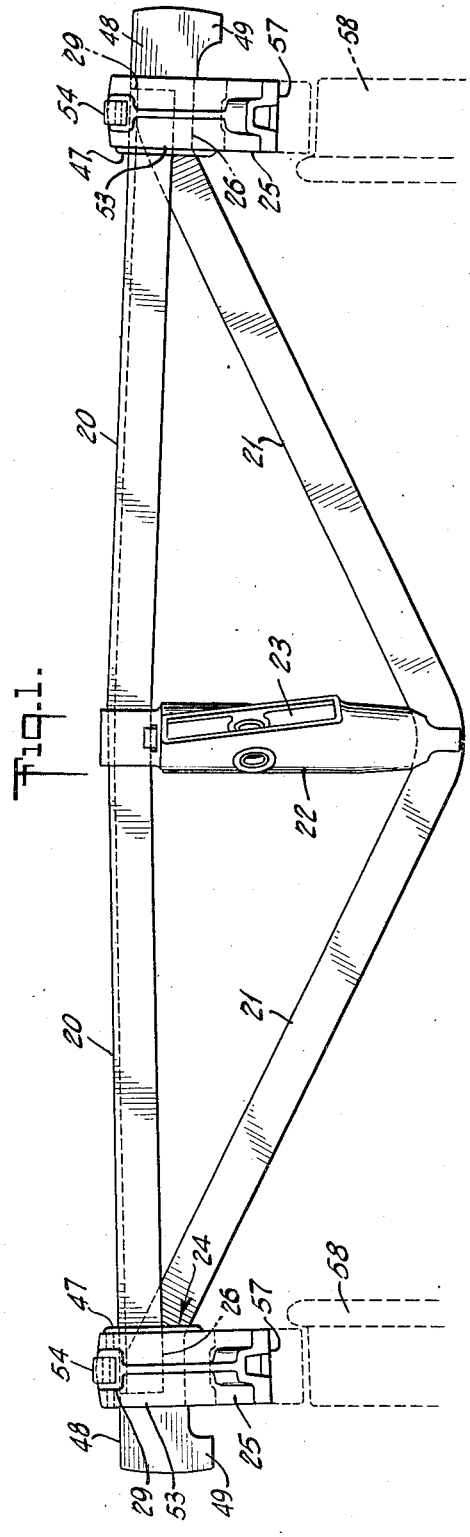
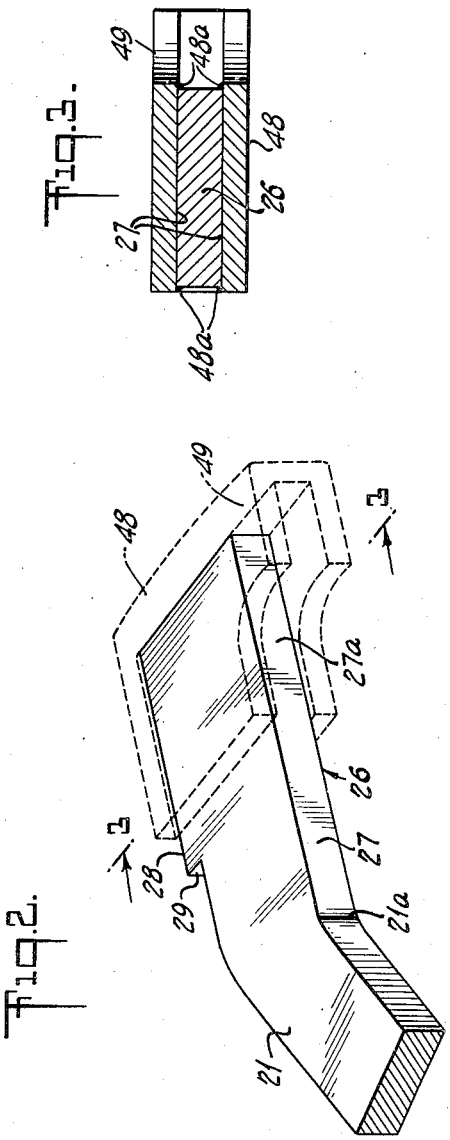
INVENTOR
CHARLES R. BUSCH.
BY Geo. L. Wheelock
ATTORNEY

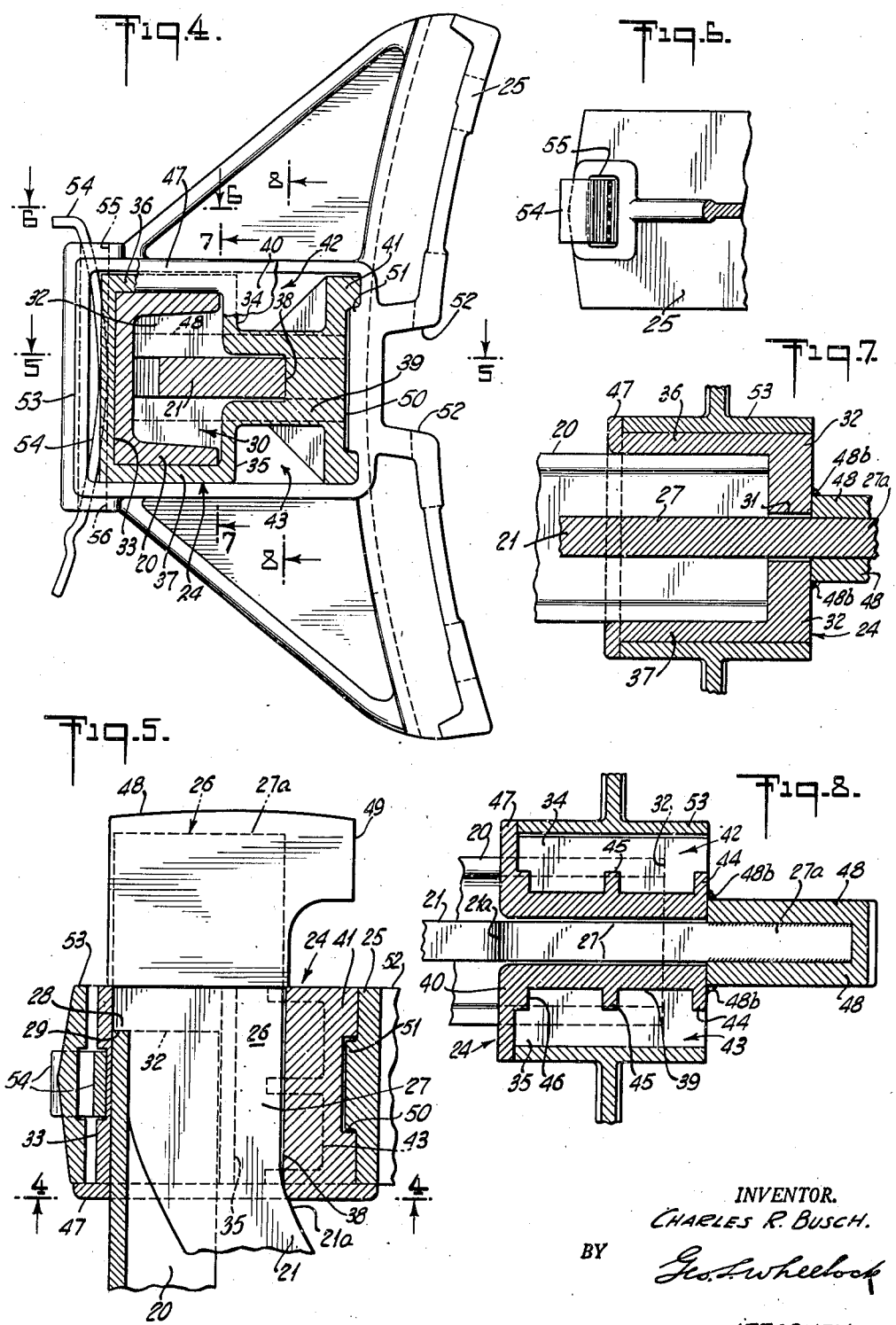

Dec. 6, 1949  C. R. BUSCH  2,490,205
BRAKE BEAM
Filed May 13, 1946  3 Sheets-Sheet 3
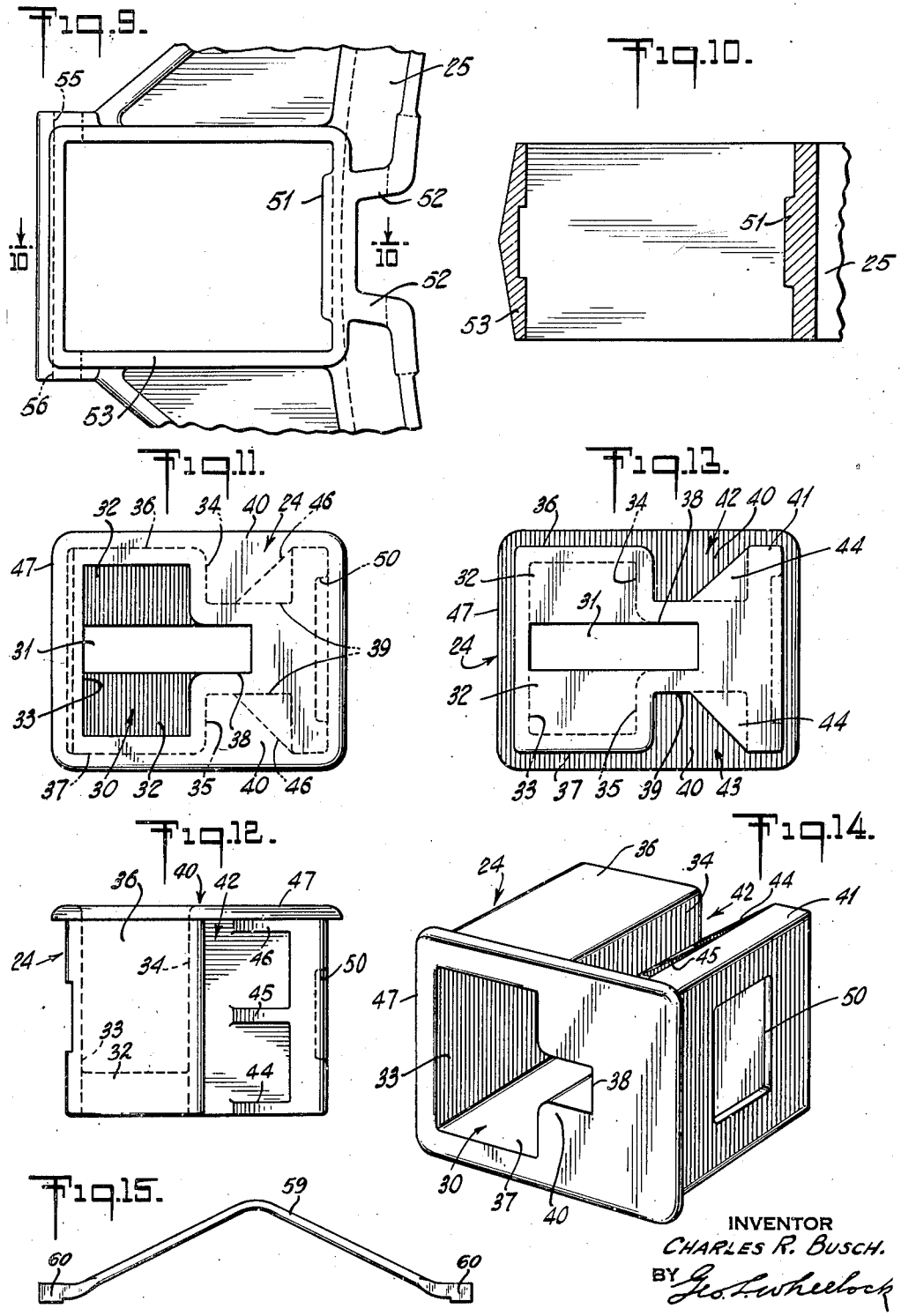
INVENTOR
CHARLES R. BUSCH.
BY Geo. L. Wheelock
ATTORNEY

Patented Dec. 6, 1949 2,490,205

UNITED STATES PATENT OFFICE 2,490,205

BRAKE BEAM

Charles R. Busch, Orange, N. J., assignor to Buffalo Brake Beam Company, New York, N. Y., a corporation of New York Application May 13, 1946, Serial No. 669,391

24 Claims. (Cl. 188—223.1)

The present invention preferably relates to brake beams of railway cars of that type in which the beam is supported from the opposite side members or frames of a car truck by guides thereon which extend from points adjacent a pair of truck wheels and along such members preferably in a downward direction for such a distance so as to permit the brake to be applied to the treads of the wheels or released therefrom, such guides usually extending in an inclined plane in common therewith and which coincides substantially with the axis of the axle of such wheels. Usually such inclination is approximately 12 degrees from the horizontal as explained in Patent 2,170,112 of August 22, 1939, but it may be somewhat more or less.

The brake beam of the present invention is preferably of the truss type and with symmetrical brake heads thereon which extend upwardly and downwardly from the plane of operation of the brake beam for the same distance, as disclosed by aforesaid patent, and which heads are preferably removable from and placeable on the beam without disturbing or dismantling it.

With a view to furnishing a brake beam highly adapted for support and guidance on side members or frames of a car truck the present invention provides as one of its objects a solid truss construction for an extremely reliable and sturdy brake beam.

Another object is to provide an assembled unit preferably consisting of only the rolled metal compression and tension members for a truss brake beam, which unit is capable of being handled as such because of the fact that said members are interlocked together at their ends, the compression member preferably being of channel form either of rectangular or U cross section and pre-bowed before assembly with the tension member.

Other objects preferably are the provision of special ultimate truss locks around the interconnected ends of the compression and tension members to positively maintain the thus assembled parts together as another unit by reason of their tight fit thereon; to provide a wear plate or member on each end of the tension member, the ends of which extend beyond the truss locks to furnish support for the brake beam on its guides, such wear members being preferably of U-shape and usually three-eighths of an inch thick and welded or the like to the front and back edges of the extended ends of the tension member; to provide wear members preferably of such character that their inner transverse edges will abut the outer ends of the truss locks, where they may be welded or the like together to the truss locks and around the tension member, so that such edges practically provide the ends of the tension member with shoulders providing locking means for the tension member, with the result that when pressure is applied to the brake beam strut the force thereof is transmitted to the tension member which in turn absorbs all pressures on the web or back portion of the compression member and on the outer sides of the truss locks.

The preceding objects being preferably some of the important objects of the present invention in end-guided brake beams, the same consists of certain features to be specified herein and then claimed, reference being had to the accompanying drawings, in which—

Fig. 1 is top plan view of the brake beam with brake heads thereon, and partly in broken lines;

Fig. 2 is a sectional perspective view of one of the end portions of the tension member, the wear member being shown in broken lines;

Fig. 3 is a section on line 3—3 of Fig. 2, the wear member being in full line section to show how it may be welded to the tension member;

Fig. 4 is a transverse section of one end of the brake beam showing a brake head mounted thereon;

Fig. 5 is a section of Fig. 4 on line 5—5;

Fig. 6 is a top view of a broken away portion of the brake head and partly in section on line 6—6, Fig. 4;

Fig. 7 is a broken vertical section of Fig. 4 on line 7—7;

Fig. 8 is a broken vertical section of Fig. 4 on line 8—8;

Fig. 9 is a broken side elevation of the brake head, partly in broken lines;

Fig. 10 is a section on line 10—10 of Fig. 9;

Fig. 11 is an elevation of the truss lock viewed toward its inner end;

Fig. 12 is a top plan of the truss lock;

Fig. 13 is an elevation of the truss lock viewed toward its outer end;

Fig. 14 is a perspective view of the truss lock; and

Fig. 15 is a modification of the tension member.

Referring to Figs. 1 and 4 of the drawings, the compression member 20 is of channel form, either of rectangular or U section or the tension member 21 is flat and of oblong shape in section. A strut 22 is provided to connect the two said members and is provided with a slot 23 to accept a live or dead lever and provide for the pivoting of the lever. As the compression and tension members are shown in Fig. 1 their full lengths, it is only necessary to illustrate and explain what is mostly shown in the remaining figures to demonstrate the construction used at both ends of the brake beam.

As shown in Figs. 4, 5, 7 and 8, one end portion of the brake beam is provided with a lock or housing member 24 which being located at each end of the beam secure the compression and tension members in truss form. A brake head 25 is mounted on such truss lock.

However, first referring to the tension member 21 as shown in Figs. 1 and 2 before describing other figures in detail, it will be seen that the tension member is bowed forwardly and provided with outwardly divergent ends 26 which are aligned along the longitudinal axis of the brake beam. Spaced away from the ends of the bow of the tension member the ends of the member are provided with widened portions 27 with flat upper and lower surfaces the widening residing in longitudinal tongues or feathers 28 at the back edges of the tension member. The said tongues have their inward ends mutually facing each other to provide abutments or shoulders 29.

The rearwardly extending abutments 29 of the tension member serve for engaging the ends of compression member 20, to establish which engagement the compression member is first sufficiently bowed backwardly by a suitable power machine and the terminals thereof snapped between and into firm engagement with the abutments 29, thereby assembling and interlocking the two members together as a unit. As shown the tension member coincides with the longitudinal central plane of the web of the compression member, the said abutments engaging the end edges of the web.

A truss lock or housing member 24 is snugly engaged over the end of aforesaid unit, and the body of which is more or less of oblong shape with squared end-surfaces, somewhat like a block as shown in detail in Figs. 11 to 14 inclusive now to be described. Sections thereof will be found in Figs. 4, 5, 7 and 8.

At one side of the truss lock 24 and occupying about the rear half thereof it is provided with a socket 30 which is open at the inner end of the lock and with a horizontal slot 31 in the wall 32 at the outer end of the lock. Back wall 33, forward spaced apart walls 34, 35, respectively, and top and bottom walls 36, 37, respectively, define the girth of the socket.

A channel 38 extending longitudinally from end to end of the truss lock and located midway of the height of the lock between the spaced walls 34, 35, is provided. Such channel opens into the socket 30, it extending along and in an intermediate longitudinal portion 39 of the lock which in transverse section is more or less like a neck. Channel 38 extends through wall 40 at the inner end of the truss lock and terminates, as does the intermediate portion 39, at the outer end of the lock, where such terminal of the channel forms a forward part of slot 31 as shown in Fig. 13.

The intermediate channeled portion 39 merges with the front wall 41 of the lock which wall generally corresponds in outline and dimensions with that of back wall 33 plus the additional thickness of walls 32, 36 and 37.

Depressions or troughs 42, 43, are provided which are located respectively above and below intermediate portion 39, the same being closed at corresponding ends by end wall 40 and defined at the sides by walls 34, 41 for the upper depression and walls 35, 41 for the lower depression, and the other ends of the depressions opening out between walls 34, 35 and the wall 41. By intermediate neck-like portion 39 certain strength is given to the truss lock 24 and by the depressions 42, 43, the lock is lightened, although additional strength is imparted by three bracket or gusset reinforcements 44, 45, 46 in each of the two corners between the front wall 41 and the intermediate portion 39. Around the inner end of the lock it is provided with a reinforcing rib or flange 47 which provides an abutment for the brake head when that is mounted on the brake beam.

Truss lock 24 is preferably made from cast or forged steel. When one is properly applied with a tight fit onto each end of the assembled unit of the compression and tension members they will be firmly bound together in truss formation, so that a sturdy unitary brake beam structure is provided to receive brake heads. Furthermore, the described truss lock will have similar halves above and below the central horizontal plane thereof adapting it for use on either end of the beam by simply inverting it.

Now referring to Figs. 4, 5, 7 and 8, to assemble the parts an end of the unit consisting of the assembled compression and tension members is forced into the lock socket 30 until the terminal of compression member 20 abuts wall 32 and the broadened end 27 of the tension member 21 enters slot 31. In so doing the forward edge of the diverging end portion 26 of the tension member is guided in channel 38 the mutually facing surfaces of whose walls constitute cheeks to snugly and strongly support such end portion and hold its rear edge against the inner surface of the web of the compression member while maintaining the interlock between the compression and tension members. Not only does the front wall of the truss lock overlap the shouldered tongue 28 of the tension member but, most important, its back wall overlaps and strongly engages with said tongue. It is now apparent that a horizontal plane passing centrally through the truss lock 24 passes correspondingly through the therein held portions of the compression member 20 and the tension member 21. Bends 21a in the front edges of the tension member serve to hold the truss locks against inward movement.

Each divergent end 26 of the tension member has sufficient length to extend beyond the truss lock 24, whereby to provide a preferably flat extension or terminal portion 27a which is strongly supported, as is the tension member itself, by the surfaces defining the slot 31, and at each end of the brake beam means for supporting and guiding the same upon side members or side frames of a railway car truck.

After the unit formed by the assembled compression and tension members together with the truss locks is constructed a wear plate or protecting member 48, shown in Figs. 1, 5, 7 and 8, and preferably consisting of a bent plate forming a cap or shoe of substantially U section, is mounted on each terminal portion 27a of the tension member it being pressed against the truss lock wall 32. The wear member preferably is welded to the front and back surfaces of the terminal portion as shown at 48a in Fig. 3 and is also welded at its inner transverse edges to the outer end of the truss lock and to the adjacent end of the channel portion 39 as shown in Fig. 8.

It will be seen from Fig. 5 that the width of the narrower parts of the wear member which are welded to the truss lock beyond the ends of slot 31 is greater than the length of the slot. Such wear member is well known to be provided with at least a forward projection or nose 49.

Each truss lock 24 has at the front surface of its forward wall 41 an interruption preferably in the form of a depression 50, with which engages a surface interruption preferably in the form of a boss 51 located on the brake head back of its brake shoe engaging lugs 52, as shown in Figs. 4 and 5.

Referring to Figs. 4, 5 and 9, the back of the brake head is provided with a collar 53 the opening of which is large so that the collar may pass over the wear member and inwardly thereof when the brake head is to be positioned on truss lock 24, and the opening of the collar is wider transversely of the head than the horizontal width of the truss lock. When the brake head has been pushed into contact with the abutment rib 47 of the truss lock it is then pushed backwardly to enter its boss 51 in the depression 50 of the lock, thereby centering and interlocking the head on the end of the brake beam.

To tend to force the brake head back against the front of the truss lock and preferably to permit of a slight shift of the head forwardly a bowed spring key 54 is passed through holes 55, 56 of collar 53, the out-curved surface of the key bearing on the back of the truss lock at about midway of its height, as shown in Figs. 4 and 6, so that the key will absorb any rearward shocks on the head.

Each brake head is of symmetrical type without a hanger opening, its face being on an inward curve which extends along the lengths of the upper and lower halves of the head. Hence, such brake head can be used at either end of the brake beam as a right or left, or it can be turned upside down at either end of the beam, its face being at an angle of 1 in 20 degrees or some other angle to correspond with the bevel of a car wheel.

Referring to Fig. 1 it will be apparent that a novel feature of this brake beam is that the bowing of the compression member 20 before engaging its terminals with the abutments 29 of the tension member 21, and then assembling the combined unit with the truss locks 24, imparts to the latter a certain inward angular position relatively to the longitudinal axis of the brake beam and hence to the brake heads, such that the middle vertical planes of the locks converge forwardly toward each other with respect to the longitudinal axis of the beam, and such that the vertical planes of the sides of the heads slightly converge forwardly so that each head has its shoe-receiving face 57 slanted inwardly to correspond with the bevel of a car wheel 58. In such manner the lower toes of the brake heads are not toed inwardly nor the upper toes outwardly, which is found to be objectionable when the compression member of a brake beam is cambered after its parts have been assembled and which results in uneven wear of the brake shoes.

It will be seen that when braking pressure is applied to the brake beam strut 22 the ensuing force is transmitted to the tension member 21 which, through the abutments or shoulders 29 thereof, in turn absorbs all pressures on the web of the compression member 20 and also on the outer faces of the truss locks 24 that are abutted by the upper and lower shoulders of the tension member which are in fact obtained by the inward edges of the wear plates.

Fig. 15 shows a slight modification of the oblong section tension member in that the body 59 of the main length thereof is round and the divergent ends 60 are upset to flatten them.

It should be stated that the strut 22 may be applied to the truss brake beam assembly of the compression and tension members, when the truss locks 24 are fixed thereon, by first applying it to the compression member and then to the tension member; holding the assembled unit in a jig until the wear members or plates 48 are welded to the tension member, and when the welding is finished applying the key of the strut to take up any slack in the assembly.

It should be stated that the strut 22 may be applied to the truss brake beam assembly of the compression and tension members when the truss locks 24 are fixed thereon by first applying it to the compression member and then to the tension member; holding the assembled unit in a jig until the wear members or plates 48 are welded to the tension member and, when the welding is finished, applying the key of the strut to take up any slack in the assembly.

It will be obvious to those skilled in the art that modifications can be made of the invention and its members without departing from the scope of the appended claims.

What I claim as new is:

1. A truss brake beam, including a tension member and a compression member longitudinal surfaces of the two members in mutual contact at both ends of the beam, means connecting the members thereat, and truss locks maintaining the connections and provided with sockets having transverse outer end walls and receiving the ends of both members, the compression member abutting the outer end walls of the sockets, and the end walls having openings into which extend the ends of the tension member.

2. A truss brake beam according to claim 1, wherein the truss locks are provided with relatively reduced longitudinal channels forward of the sockets and receiving forward edge portions of the ends of the tension member.

3. A truss brake beam according to claim 1, wherein the openings in said walls are partly formed by the ends of channels forward of the sockets and into which channel ends the ends of the tension member also extend.

4. A truss brake beam according to claim 1, wherein the ends of the tension member are extended beyond the end walls of the sockets to support and guide the brake beam, and including wear members on and protecting the extensions and providing the tension member with shoulders in contact with such walls.

5. A truss brake beam, including tension and compression members, the tension member having divergent ends extending outwardly therefrom in substantial alignment, truss locks provided with sockets receiving the ends of the two members, the outer ends of the sockets having walls provided with openings and the terminals of the compression member abutting the walls, and spaced means on and along each of the divergent ends of the tension member and abutting both ends of each truss lock, the tension member extending into such openings.

6. A truss brake beam according to claim 5, including extensions of the tension member beyond the walls for supporting and guiding the brake beam, and wear members fixed on the extensions and providing the means for abutting the outer end of each truss lock.

7. A truss brake beam according to claim 5, including abutments on the ends of the tension member which abut and confine the compression member between them.

8. A truss brake beam according to claim 5, including longitudinal tongues projecting from the backs of the ends of the tension member, the inward ends of which abut the terminals of the compression member.

9. A truss brake beam, including tension and compression members, the ends of the tension member being substantially flat in the horizontal plane of the beam and the compression member of channel form, and the rear edges of the ends of the tension member contacting the web of the compression member along between the flanges thereof and spaced away from the flanges, means for attaching the ends of the two members, and truss locks having sockets receiving the attached ends of the two members, the outer ends of the sockets provided with horizontally slotted walls, and the thus spaced ends of the tension member extending into the slots.

10. A truss brake beam according to claim 9, wherein the truss locks are provided in front of the sockets with channels forming forward reductions thereof and in which fit the front edges of the ends of the tension member.

11. A truss brake beam according to claim 9, wherein the ends of the tension member are extended beyond the truss locks, and U-shaped wear plates fitted on and fixed to the extensions, the inner edges of the plates abutting the slotted walls above and below the slots.

12. A lock for the truss of a brake beam, the lock including a block-like body having a socket with an outer end wall and extending from the inner end of such body to the wall at the outer end and the socket adapted to receive the ends of the compression and tension members of such beam, the wall having a transverse slot extending across the socket, and the truss lock adapted for the mounting of a brake head thereon.

13. A brake beam truss lock according to claim 12, wherein the slot extends forwardly beyond the socket.

14. A brake beam truss lock according to claim 12, wherein the lock body is provided with a longitudinal channel opening into the socket, the outer end of the channel forming a forward extension of the slot.

15. A brake beam truss lock according to claim 12, wherein the slot is in the approximate middle horizontal plane of the lock body to render the truss lock reversible.

16. A brake beam truss lock according to claim 12, including a longitudinal channel opening into the socket and its outer end forming a forward part of the slot, the slot and the channel being in the approximate middle horizontal plane of the lock body to render the lock reversible.

17. A lock for the truss of a brake beam, comprising a block-like body having a socket with an outer end wall and extending from its inner end to the wall at its outer end and the socket located at the back portion of the body, a front wall, and an intermediate, reduced, neck-like portion between the upper and lower surfaces of the body and extending longitudinally of the body between the front wall and the socket, the outer end wall having a transverse slot opening into the socket.

18. A brake beam truss lock according to claim 17, wherein the intermediate portion is provided with a longitudinal channel extending through the outer wall, and its end there forming a part of the slot.

19. A brake beam truss lock according to claim 17, wherein the intermediate portion is provided with a longitudinal channel extending through the outer wall, and its end there forming a part of the slot, the slot and the channel in substantially the middle horizontal plane of the lock body, whereby the truss lock is rendered reversible for use at either end of a brake beam.

20. A truss brake beam, including a tension member and a bowed compression member, the end portions of the tension member interlocked with the terminals of the compression member after the same has been bowed, and truss locks surrounding the points of interlock and maintaining the interlock which locks are adapted to receive brake heads, the end portions of the tension member being extended beyond the truss locks, together with shoulders on the end portions of the tension member abutting the outer ends of the locks.

21. A truss brake beam, including a tension member and a bowed compression member, the end portions of the tension member interlocked with the terminals of the compression member after the same has been bowed, and truss locks surrounding the points of interlock and maintaining the interlock which locks are adapted to receive brake heads, the end portions being extended beyond the truss locks, together with wear protecting members on the extensions abutting the adjacent ends of the truss locks.

22. A truss brake beam having a tension member and a pre-bowed compression member, end portions of which are attached together to form a unit after the bowing of the compression member, a strut between the two members, truss locks mounted around the thus attached portions of the two members, and free from flanges at their outer ends and brake heads mounted on the truss locks, each such head having a lateral fit onto one of the locks, the approximate middle vertical planes of the locks converging forwardly toward each other in the said planes with respect to the longitudinal axis of the beam, and corresponding planes of the brake heads when fitted onto the locks similarly converging, thus slanting the brake shoe receiving faces at angles toward each other to correspond with the bevel of the car wheels, so that when brake shoes are mounted on the heads even wear thereof will be obtained, the ends of the thus attached tension member being extended beyond the said truss locks to provide extensions adapted to support and guide the brake beam upon side members of a car truck, and including wear members rigidly fixed on the extensions to protect them, and the edges of the wear members adjacent the truss locks abutting the outer ends of the locks as shoulders on the tension member.

23. A truss brake beam having a tension member and a pre-bowed compression member, end portions of which are attached together to form a unit after the bowing of the compression member, a strut between the two members, truss locks mounted around the thus attached portions of the two members, and free from flanges at their outer ends and brake heads mounted on the truss locks, each such head having a lateral fit onto one of the locks, the approximate middle vertical planes of the locks converging forwardly toward each other in the said planes with respect to the longitudinal axis of the beam, and corresponding planes of the brake heads when fitted onto the locks similarly converging, thus slanting the brake shoe receiving faces at angles toward each other to correspond with the bevel of the car wheels, so that when brake shoes are mounted on the heads even wear thereof will be obtained, the ends of the thus attached tension member being extended beyond the said truss locks to provide extensions adapted to support and guide the brake beam upon side members of a car truck, and including wear members rigidly fixed on the extensions to protect them, and the edges of the wear members adjacent the truss locks abutting the outer ends of the locks as shoulders on the tension member, each such truss lock being reversible for use at either end of the brake beam, and each such brake head symmetrical and reversible for use at either end of the beam.

24. A truss lock brake beam, comprising a tension member and a compression member prebowed and the terminals thereof then attached to end portions of the tension member, and truss locks around the points of attachment to maintain the attachment, the ends of the tension member extending beyond the compression member and the points of attachment and the truss locks to afford support and guidance for the brake beam on side members of a car truck, the rear portions of the truss locks receiving the ends of the tension and compression members, forwardly facing front walls on the truss locks, intermediate portions between the rear portions and the front walls and provided with channels intermediate the height of the truss locks and receiving parts of the tension member.

CHARLES R. BUSCH.

REFERENCES CITED

The following references are of record in the file of this patent:

UNITED STATES PATENTS

| Number | Name | Date |
|---|---|---|
| 895,269 | Huntoon | Aug. 4, 1908 |
| 960,935 | Huntoon | June 7, 1910 |
| 2,356,720 | Aurien | Aug. 22, 1944 |

Disclaimer 2,490,205.—*Charles R. Busch*, Orange, N. J. BRAKE BEAM. Patent dated Dec. 6, 1949. Disclaimer filed Oct. 6, 1951, by the inventor and the assignee, *Buffalo Brake Beam Company*.

Hereby enter this disclaimer to claims 1, 2, 9, and 10 of said patent, as follows:

To the words "truss locks" in said claims, except with the meaning that said words indicate members for receiving and mounting brake heads thereon which are removable therefrom, the brake heads constituting entirely separate elements from the truss locks.

[*Official Gazette November 6, 1951.*]